US009104026B2

(12) United States Patent
Epple et al.

(10) Patent No.: US 9,104,026 B2
(45) Date of Patent: Aug. 11, 2015

(54) OPTICAL IMAGING DEVICE AND IMAGING METHOD FOR MICROSCOPY

(75) Inventors: Alexander Epple, Aalen (DE); Ella Mizkewicz, Minsk (BY); Heiko Feldmann, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 1385 days.

(21) Appl. No.: 12/568,483

(22) Filed: Sep. 28, 2009

(65) Prior Publication Data

US 2010/0188738 A1 Jul. 29, 2010

Related U.S. Application Data

(60) Provisional application No. 61/101,510, filed on Sep. 30, 2008.

(30) Foreign Application Priority Data

Sep. 30, 2008 (DE) .......................... 10 2008 049 589

(51) Int. Cl.
| | | |
|---|---|---|
| *G02B 17/00* | (2006.01) | |
| *G02B 21/00* | (2006.01) | |
| *G02B 23/00* | (2006.01) | |
| *G02B 21/04* | (2006.01) | |
| *G02B 17/06* | (2006.01) | |

(52) U.S. Cl.
CPC ............ *G02B 21/04* (2013.01); *G02B 17/0631* (2013.01)

(58) Field of Classification Search
CPC . G02B 17/0812; G02B 17/08; G03F 7/70275

USPC ................. 359/350–357, 725–732, 850–861, 359/364–366, 368–398; 355/53–78
See application file for complete search history.

(56) References Cited

U.S. PATENT DOCUMENTS

| | | | | |
|---|---|---|---|---|
| 3,527,526 | A | * | 9/1970 | Silvertooth .................... 359/859 |
| 3,748,015 | A | * | 7/1973 | Offner .......................... 359/366 |
| 4,863,253 | A | | 9/1989 | Shafer et al. |
| 5,031,976 | A | | 7/1991 | Shafer |
| 5,638,219 | A | * | 6/1997 | Medina Puerta et al. ..... 359/729 |
| 6,600,608 | B1 | | 7/2003 | Shafer et al. |
| 6,639,734 | B2 | | 10/2003 | Omura |

(Continued)

FOREIGN PATENT DOCUMENTS

| | | |
|---|---|---|
| DE | 10 2005 056 721 | 11/2006 |
| EP | 0 267 766 A2 | 5/1988 |
| WO | WO 2009046137 A1 * | 4/2009 |

*Primary Examiner* — Scott J Sugarman
*Assistant Examiner* — Tamara Y Washington
(74) *Attorney, Agent, or Firm* — Fish & Richardson P.C.

(57) ABSTRACT

The present invention relates to an optical imaging device, in particular for microscopy, with a first optical element group and a second optical element group, wherein the first optical element group and the second optical element group, on an image plane, form an image of an object point of an object plane. The first optical element group includes a first optical element with a reflective first optical surface and a second optical element with a reflective second optical surface. The second optical element group includes a third optical element with a reflective third optical surface. The first optical element and the second optical element are formed and arranged such that on formation of the image of the object point, in each case a multiple reflection of at least one imaging beam takes place on the first optical surface and the second optical surface.

29 Claims, 3 Drawing Sheets

(56) References Cited

U.S. PATENT DOCUMENTS

| | | | |
|---|---|---|---|
| 8,164,622 B2* | 4/2012 | Crandall | 348/79 |
| 2004/0114217 A1 | 6/2004 | Mann et al. | |
| 2004/0218163 A1 | 11/2004 | Sasaki et al. | |
| 2006/0017905 A1 | 1/2006 | Suzuki | |
| 2007/0070322 A1 | 3/2007 | Hudyma et al. | |
| 2007/0153398 A1 | 7/2007 | Shafer et al. | |
| 2007/0223112 A1 | 9/2007 | Mann et al. | |
| 2007/0258070 A1* | 11/2007 | Fujiwara | 355/53 |
| 2010/0149632 A1 | 6/2010 | Mann et al. | |

* cited by examiner

OPTICAL IMAGING DEVICE AND IMAGING METHOD FOR MICROSCOPY

CROSS-REFERENCE TO RELATED APPLICATIONS

This application claims priority under 35 U.S.C. §119(e)(1) to U.S. Provisional Application No. 61/101,510 filed Sep. 30, 2008. This applications also claims priority under 35 U.S.C. §119 to German Patent Application DE 10 2008 049 589.1, filed Sep. 30, 2008. The contents of both of these applications are hereby incorporated by reference in their entirety.

BACKGROUND OF THE INVENTION

The present invention relates to optical imaging devices and imaging methods for microscopy. The invention can be applied in connection with the inspection of arbitrary surfaces or bodies.

In many technical areas, it is necessary, amongst other, to subject bodies and their surfaces to a precise optical inspection in order to be able, for example, to assess the quality of a production process and, where applicable, intervene correctively insofar as the inspection reveals that specified quality criteria are not fulfilled. Naturally the same if not higher requirements must be imposed on the precision of the imaging device used for the inspection in comparison with the devices used for the production process of the body to be inspected.

In this context, the ability of the imaging device used for the inspection to process light of different wavelengths with minimum optical aberration is of particular importance in order to ensure a broad field of application for the imaging device. In connection in particular with the production methods which comprise an optical process, it is desirable or advantageous if the imaging device used can process the wavelength range typically also used during the optical process with minimum aberrations. This is preferably the wavelength range of 193 mm (so called VUV range) to 436 mm (so called Hg g line). Such broad bandwidth requirements exist, for example, in the field of fluorescence microscopy in connection with the avoidance of thin layer interference on the surface etc.

A problem here is the chromatic aberrations i.e. the aberrations dependent on the light wavelength. If for example an imaging device with refractive optical elements (such as lenses or similar) is used for inspection, the aberrations of the imaging device are minimized at acceptable cost usually only for a comparatively narrow range of wavelengths. A so-called achromatization of such an imaging device comprising refractive optical elements, i.e. elimination of such chromatic aberrations, is scarcely possible with acceptable cost over a broadband wavelength range (such as that described above).

Frequently, so-called catadioptric imaging devices are used which, apart from refractive optical elements, also comprise reflective optical elements. The disadvantages of refractive systems described above however also apply to such catadioptric systems as known for example from DE 10 2005 056 721 A1 (Epple et al.), U.S. Pat. No. 6,600,608 B1 (Shafer et al.), U.S. Pat. No. 6,639,734 B1 (Omura) and U.S. Pat. No. 5,031,976 (Shafer), the entire disclosure of which is hereby incorporated herein by reference.

One possibility of largely avoiding the problems associated with chromatic aberrations is to use so-called catoptric systems in which exclusively reflective optical elements (such as mirrors or similar) are used for the imaging device. Examples of such catoptric systems are known from EP 0 267 766 A2 (Phillips), U.S. Pat. No. 4,863,253 (Shafer et al.) and US 2004/0114217 A1 (Mann et al.), the entire disclosure of which is hereby incorporated herein by reference.

The problem with these known catoptric systems however is that, for a desirably large magnification to be achieved with as few optical elements as possible, in particular for the optical elements close to the object, comparatively large individual refractive powers are required. However, in view of the aberrations generated with such catoptric systems, this is disadvantageous so that frequently the use of more than four mirrors is preferred, as is known from US 2004/0114217 A1 (Mann et al.), or smaller magnifications or greater aberrations, respectively, are accepted.

In this context it is known from EP 0 267 766 A2 (Phillips), instead of the conventional imaging devices with four mirrors, to use a system with three mirrors in which one of the mirrors is used repeatedly in that it constitutes both the second mirror and the fourth mirror in the path of the imaging beam. The advantage of this is that one mirror is saved. The arrangement of the other two mirrors which must each face this mirror requires, however, a configuration with which only a comparatively small numerical aperture can be achieved (at acceptable mirror size).

BRIEF SUMMARY OF THE INVENTION

The present invention is therefore based on the object of providing optical imaging devices and optical imaging methods which do not have or which have to a lesser extent the above disadvantages, and which, in particular with acceptable size of the optical elements used, allow a high magnification and a high numerical aperture with minimum aberrations.

The present invention is based on the cognition that in a simple manner, with acceptable size of the optical elements used, a high magnification and a high numerical aperture can be achieved with minimum aberrations if, in a system with at least three, preferably four optical elements, at least one of the optical elements is used repeatedly, preferably two of the optical elements are used repeatedly. It has been found that with suitable arrangement of the optical elements with this multiple use of individual optical elements, a reduction (advantageous with regard to aberration) in individual refractive power is possible, in particular of the optical element close to the object, without loss of magnification and with simultaneously high numerical aperture.

According to a first aspect, the present invention therefore relates to an optical imaging device, in particular for microscopy, with a first optical element group and a second optical element group, wherein the first optical element group and the second optical element group form, on an image plane, an image of an object point of an object plane. The first optical element group comprises a first optical element with a reflective first optical surface and a second optical element with a reflective second optical surface. The second optical element group comprises a third optical element with a reflective third optical surface. The first optical element and the second optical element are formed and arranged such that on formation of the image of the object point, in each case a multiple reflection of at least one imaging ray takes place on the first optical surface and the second optical surface.

According to a further aspect, the present invention relates to an optical imaging device, in particular for microscopy, with a first optical element group and a second optical element group, wherein the first optical element group and the second optical element group form, on an image plane, an image of an object point of an object plane via at least one imaging ray having an imaging ray path. The first optical element group comprises a first optical element in the imaging ray path with a reflective first optical surface and a second optical element in the imaging ray path with a reflective second optical surface, while the second optical element group comprises a third optical element in the imaging ray path with a reflective third optical surface. The first optical surface faces away from the third optical surface and is formed such that on formation of the image of the object point, a multiple reflection of the imaging ray takes place on the first optical surface.

According to a further aspect, the present invention relates to a microscope, in particular for the inspection of a substrate, with a substrate device to hold a substrate to be inspected, an illumination device to illuminate the substrate with at least one imaging ray, a projection device and an image receiving device, wherein the projection device is designed to project the imaging ray onto the image receiving device. The projection device itself comprises an optical imaging device according to the invention.

According to a further aspect, the present invention relates to an imaging method, in particular for microscopy, in which via a first optical element group and a second element group, by means of at least one imaging ray an image of an object point of an object plane is formed on an image plane. The first optical element group comprises a first optical element with a reflective first optical surface and a second optical element with a reflective second optical surface, while the second optical element group comprises a third optical element with a reflective third optical surface. In forming the image of the object point, the imaging ray is reflected multiple times in each case on the first optical surface and the second optical surface.

According to a further aspect, the present invention finally comprises an imaging method, in particular for microscopy, in which via a first optical element group and a second optical element group, an image of an object point of an object plane is formed on an image plane via at least one imaging ray having an imaging ray path. The first optical element group comprises a first optical element in the imaging ray path with a reflective first optical surface and a second optical element in the imaging ray path with a reflective second optical surface, while the second optical element group comprises a third optical element in the imaging ray path with a reflective third optical surface. In forming the image of the object point, a multiple reflection of the imaging ray takes place on the first optical surface facing away from the third optical surface.

Further preferred embodiments of the invention will become apparent from the dependent claims and the following description of preferred embodiments which refers to the appended figures.

DETAILED DESCRIPTION OF THE INVENTION

First Embodiment

Figure 1:
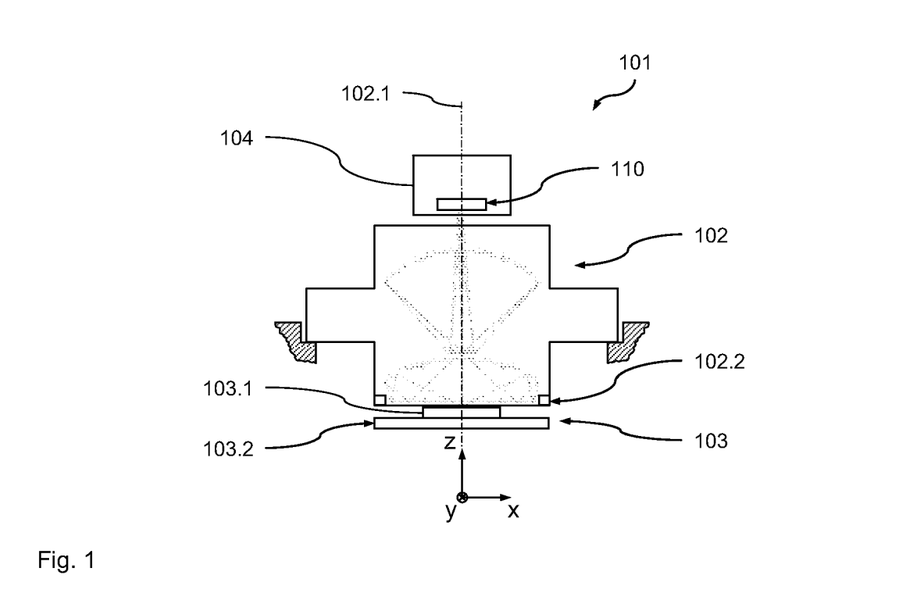
FIG. 1 is a schematic representation of a preferred embodiment of a microscope according to the invention with a preferred embodiment of the optical imaging device according to the invention, with which a preferred embodiment of an imaging method according to the invention can be performed.
Figure 2:
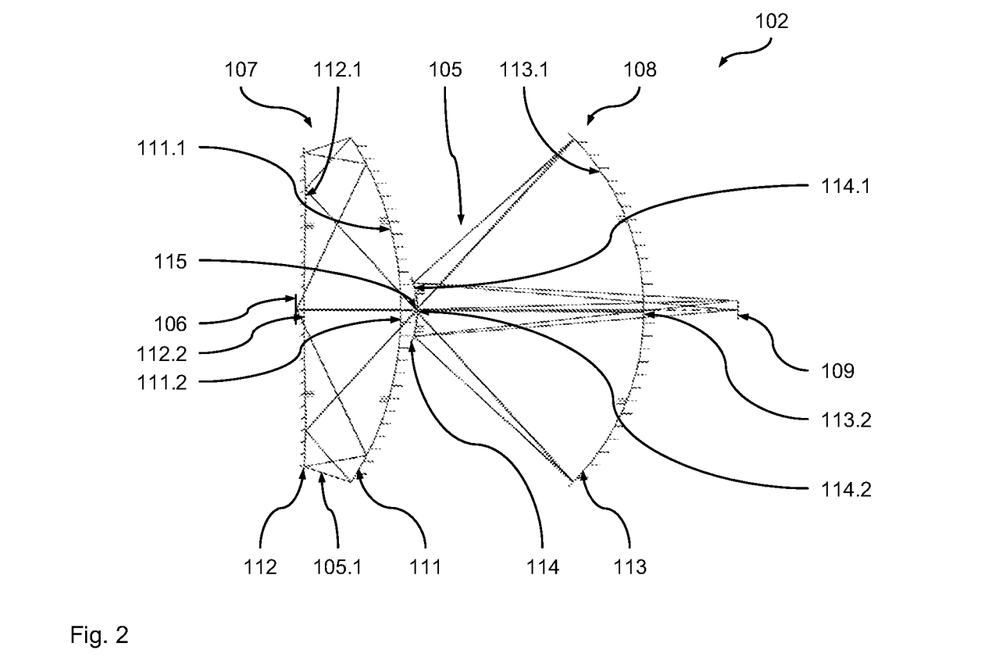
FIG. 2 is a schematic view of the optical imaging device of FIG. 1.
Figure 3:
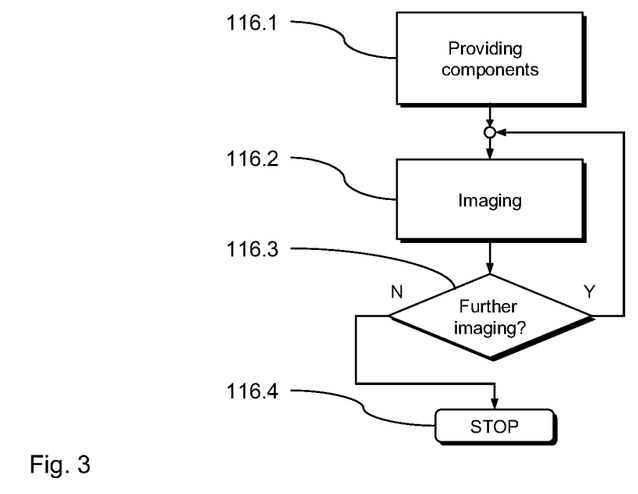
FIG. 3 is a block diagram of a preferred embodiment of the imaging method according to the invention which can be performed with the microscope of FIG. 1.

With reference to FIGS. 1 to 3, a preferred embodiment of the microscope 101 according to the invention with a preferred embodiment of the optical imaging device 102 according to the invention is described below.

In the present example, the microscope 101 is used to inspect the structures formed on a substrate 103.1 (which were produced for example via an optical process). However, with other variants of the invention, the microscope according to the invention can also be used for an imaging process in connection with arbitrary other applications, in particular the inspection of arbitrary other bodies, substrates, surfaces or liquids etc.

FIG. 1 shows a schematic representation of the microscope 101 which comprises an optical imaging device in the form of an objective 102 (with an optical axis 102.1 and illumination system 102.2), a substrate device 103 and an image recording device 104. The illumination system 102.2 illuminates (via a light guide device not shown in more detail) the substrate 103.1 which is arranged on a substrate table 103.2 of the substrate device 103, with an imaging light beam 105 (only depicted partially through its envelope rays) which comprises a plurality of imaging rays 105.1.

An image of the structures located in a so-called object plane 106 on the surface of the substrate 103.1 facing the objective 102 is formed, via the optical elements of a first optical element group 107 and a second optical element group 108 arranged in the objective 102, by means of the imaging light beam 105 on an image plane 109 of an image sensor 110 of the image recording device 104. The data obtained from signals of the image sensor 110 are then used in a conventional manner to inspect the surface of the substrate 103.1.

The first optical element group 107 comprises a first optical element 111 (reached as the first optical element by the imaging rays 105.1) in the imaging ray path of the imaging rays 105.1 and a second optical element 112 (reached as the second optical element by the imaging rays 105.1) in the imaging ray path of the imaging rays 105.1. The second optical element group 108 comprises a third optical element 113 (reached as the third optical element by the imaging rays 105.1) in the imaging ray path of the imaging rays 105.1 and a fourth optical element 114 (reached as the fourth optical element by the imaging rays 105.1) in the imaging ray path of the imaging rays 105.1.

The optical elements 111 to 114 of the optical element groups 107 and 108 (which define an optical axis 102.1 of the objective 102 or, where applicable, a symmetry axis of the objective 102), in the present example, are reflective optical elements (in the form of mirrors or similar) with aspherical optical surfaces 111.1 to 114.1.

The exclusive use of reflective optical surfaces has the advantage that, at different wavelengths of the imaging light beam 105, no significant chromatic aberrations occur in the formation of an image of a point of the object plane 106 on a point of the image plane 109 with the objective 102, corrected accordingly where necessary for any aberrations. Thus, for the imaging light beam 105, light of a wide wavelength range can be used. In particular the wavelength of the imaging light beam 105 can be adapted to the wavelength of the light which was used for production of the structures on the substrate 103.1.

In the present example, for the imaging light beam 105, light in the UV range with a wavelength of 193 nm is used. As previously stated, however, in other variants of the invention, other wavelengths can also be used. In the present example the objective 102 is a broadband objective which can process, without significant chromatic aberrations, for the imaging light beam 105, light in a wavelength range from 193 nm (so-called VUV range) to 436 nm (so called Hg g line). In this range, for the imaging light beam 105, among others wavelengths of 248 nm (so called DUV range), 365 nm (so-called Hg i line) and 405 nm (so called Hg h line) can be used.

As can be seen in particular from FIG. 2 (which shows a diagrammatic view of the first and second optical element groups 107 and 108), the first optical element 111 has a concave reflective first optical surface 111.1 which faces a slightly concave reflective second optical surface 112.1 of the second optical element 112. Similarly, the third optical element 113 has a reflective third optical surface 113.1 which faces a reflective fourth optical surface 114.1 of the fourth optical element 114.

The imaging rays 105.1 emitted by the object plane 106, first, pass through a central passage aperture 112.2, arranged in the area of the optical axis 102.1, of the second optical element 112 which lies spatially closest to the object plane 106. From there, the imaging rays 105.1, first, contact for the first time the first optical surface 111.1 and are reflected here for the first time. Then, the imaging rays 105.1 contact the second optical surface 112.1 for the first time and are reflected here for the first time.

As is evident, in particular, from FIG. 2, the first optical surface 111.1 and the second optical surface 112.1 are formed and spatially associated to each other such that the imaging rays 105.1, after their first reflection on the second optical surface 112.1, again contact the first optical surface 111.1 and are reflected there again such that they contact the second optical surface 112.1 for a second time and are reflected there again. Then, the imaging rays 105.1 pass through a central passage aperture 111.2, arranged in the area of the optical axis 102.1, of the first optical element 111.

Thanks to this multiple reflection of the imaging rays 105.1 on the first optical surface 111.1 and the second optical surface 112.1 (in particular the multiple reflection of the imaging rays 105.1 on the first optical surface 111.1) it is possible to keep the respective individual refractive power of the first optical surface 111.1 and the second optical surface 112.1 low (in particular the individual refractive power of the first optical surface 111.1) without the need to accept deterioration in the resolution achieved (hence, here, the numerical aperture achieved). In particular, the reduction in individual refractive power of the first optical surface 111.1 is of particular benefit with regard to a reduction of aberration of the objective 102.

In the present example there is a respective double reflection of an imaging ray 105.1 on the first optical surface 111.1 and the second optical surface 112.1. This double reflection has the benefit that even with still advantageously small dimensions of the first and second optical element 111, 112, a particularly favourable reduction in aberration can be achieved with acceptable obscuration and high numerical aperture on the object-side end of the lens 102. It is however evident that in other variants of the invention it can also be provided that at the first and/or the second optical surface, more than two reflections of an imaging ray take place.

As is further evident from FIG. 2, the first optical surface 111.1 and the second optical surface 112.1 are formed and spatially associated to each other such that the imaging rays 105.1, after repeated reflection on the second optical surface 112.1, generate a real intermediate image 115. The intermediate image 115 is formed in the area of a central passage aperture 114.2 (arranged in the area of the optical axis 102.1) of the fourth optical element 114, through which the imaging rays 105.1 enter the space between the two optical elements 113 and 114 of the second optical element group 108 which is formed in the manner of a Cassegrain system with a concave third optical surface 113.1 and a convex fourth optical surface 114.1.

The objective 102 at its object-side end has a numerical aperture NA>0.7. In the present example the numerical aperture on the object side is approximately NA=0.9. The object-side end of the objective 102 is therefore a high aperture end of the objective 102. As further shown in FIG. 2, the numerical aperture in the area of the intermediate image 115 is smaller than the numerical aperture at the object-side end, so that the image formed by the first optical element group 117 on the intermediate image 115 is consequently a magnified image.

The arrangement of the intermediate image 115 in the area of the passage aperture 114.2 has the advantage that the passage aperture 114.2 can be formed comparatively small in order to also keep the obscuration it causes small. The third optical surface 113.1 and the fourth optical surface 114.1 are designed and associated to each other so that the imaging rays 105.1, after passing through the passage aperture 114.2, first contact the third optical surface 113.1 and are reflected there. Then, the imaging rays 105.1 contact the fourth optical surface 114.1 and are reflected on the latter such that they pass through a central passage aperture 113.2 (arranged in the area of the optical axis 102.1) of the third optical element 113. Finally, the imaging rays 105.1 contact the image plane 109 to form a final image.

The second optical element group 108 provides a further magnification of the intermediate image such that, in total, with the objective 102 an advantageously strong magnification can be achieved. With the present objective 102, apart from the high numerical aperture NA=0.90 on the object side, amongst others a favourable field size (field height) of approximately 1 mm at the high aperture end can be achieved. In preferred variants of the objective according to the invention, the half field diameter of the lens at this high aperture end in each case is more than 0.2 mm, so that, advantageously, a corrected Petzval sum is guaranteed for the lens. Furthermore, advantageously, a correction is possible of aberrations which lie above 95% Strehl ratio (corresponding to a mean wave front deviation of approximately 35 m$\lambda$ rms).

The pupil obscuration of the objective 102 is at maximum 20% (in diameter), wherein the maximum aperture of the optical elements in the present example at the high aperture end of the lens 102 is approximately 50% of the numerical aperture NA, i.e. here around 0.45. Preferably this maximum aperture is less than 0.60. Finally, the distortion of the lens 102 is less than 0.02%.

The second optical element 112 furthermore has an aspect ratio (ratio of the dimension in the direction of the optical axis 102.1 in the centre area to the diameter) of less than 0.03 (i.e. in other words, less than 3%). The resulting small distance between the second optical surface 112.1 and the surface of the substrate 103.1 in a simple manner allows the high numerical aperture with low obscuration.

FIG. 3 shows a flow diagram of a preferred variant of an imaging method according to the invention of the optical element 106.1, which is performed with the microscope 101.

First, in step 116.1, the components of the microscope 101 are made available and positioned in the manner described above.

In a step 116.2, substrate 103.1 is illuminated with the imaging light beam 105 via the illumination device 102 and then an image of corresponding areas of the surface of the substrate 103.1 is formed via the objective 102 on the sensor surface of the image sensor 110 as described above.

In a step 116.3 it is then checked whether a further imaging process should be performed. If this is the case, we return to step 116.2. Otherwise the process ends in a step 116.4.

Second Embodiment

Figure 4:
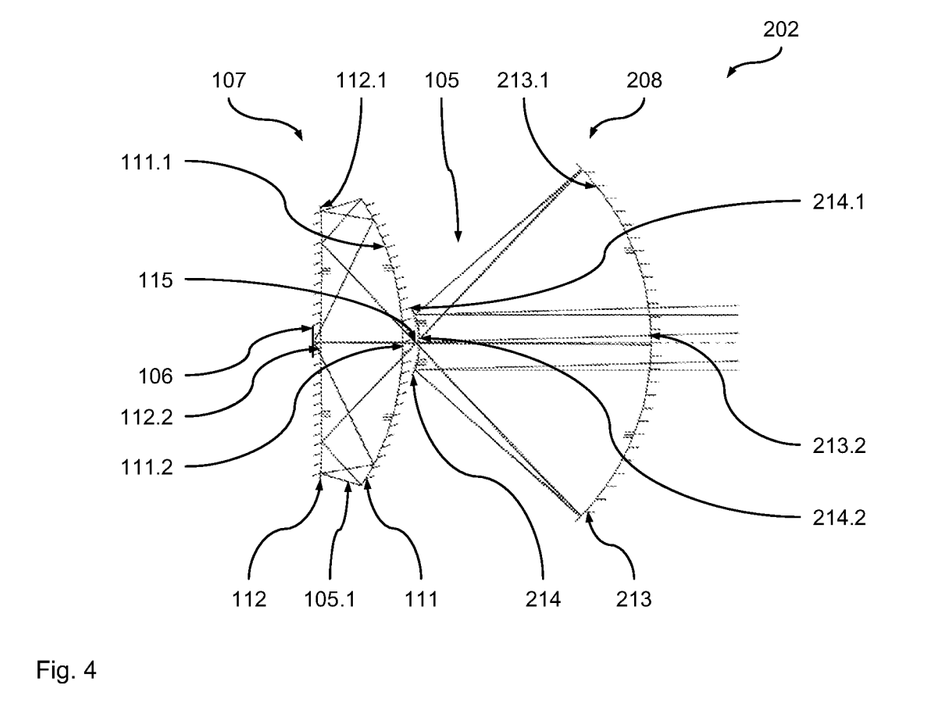
FIG. 4 is a schematic view of a further preferred embodiment of the optical imaging device according to the invention.

A further preferred embodiment of the optical imaging device according to the invention in the form of an objective 202 is described below with reference to FIGS. 1 and 4. The objective 202 can be used in the microscope 101 instead of the objective 102. The objective 202, in its basic structure and functionality, corresponds to the objective 102 from FIG. 2 so that merely the differences shall be discussed here. In particular, similar components carry the same reference numerals incremented by a value of 100. Unless specified otherwise below, with regard to the features of these components, reference is made expressly to the statements given above.

The sole difference of lens 202 from lens 102 is that the fourth optical element 214, on the one hand, has been modified in the design of the fourth optical surface 214.1 such that the image of a point on the object plane is formed on an image plane lying in infinity (not shown). Furthermore, the third optical element 213 is provided with a slightly enlarged passage aperture 213.2 (because of the image formation towards infinity).

The image towards infinity formed with the first optical element group 107 and the second optical element group 208 of the objective 202 advantageously facilitates the addition, if desired, of a barrel optic (not shown) of the lens 202.

Third Embodiment

Figure 5:
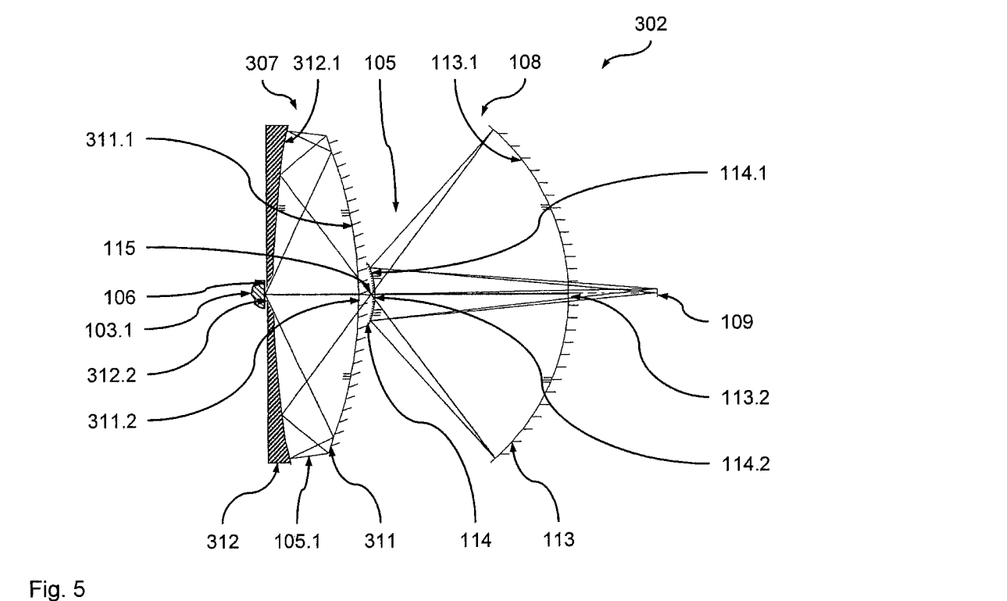
FIG. 5 is a schematic view of a further preferred embodiment of the optical imaging device according to the invention.

A further preferred embodiment of the optical imaging device according to the invention in the form of an objective 302 is described below with reference to FIGS. 1 and 5. The objective 302 can be used in the microscope 101 instead of the objective 102. The objective 302 corresponds in its fundamental structure and function to the objective 102 from FIG. 2, so that merely the differences shall be discussed here. In particular, similar components carry the same reference numerals incremented by a value of 200. Unless specified otherwise below, with regard to the features of these components, reference is made expressly to the statements above.

The main difference of the objective 302 from objective 102 is the design of the second optical element 312 lying spatially closest to the object plane 106. In the present example, the second optical element 312 is shown as a pronounced concave mirror with a high edge thickness (in the peripheral area of the optical element 312, the dimension of the optical element 312 in the direction of the optical axis 302.1).

As the edge thickness has a substantial influence on the achievable overall rigidity of the optical element 312, this has the advantage that, on the one hand, despite a smaller centre thickness (in the centre area or area of the optical axis 302.1, the dimension of the optical element 312 in the direction of the optical axis 302.1), an overall comparatively rigid second optical element 312 can be achieved. The high rigidity of the second optical element 312 guarantees, under both thermal and under static and dynamic load, an adequate stability of the second optical element 312 and, hence, in operation of the microscope 301, a small finite vertex distance or distance of the second optical surface 312.1 (in the direction of optical axis 302.1) to the overall surface of the substrate 103.1. Thanks to this design, on the object side the high numerical aperture can easily be guaranteed with a small obscuration (small diameter of the passage aperture 312.2).

Fourth Embodiment

Figure 6:
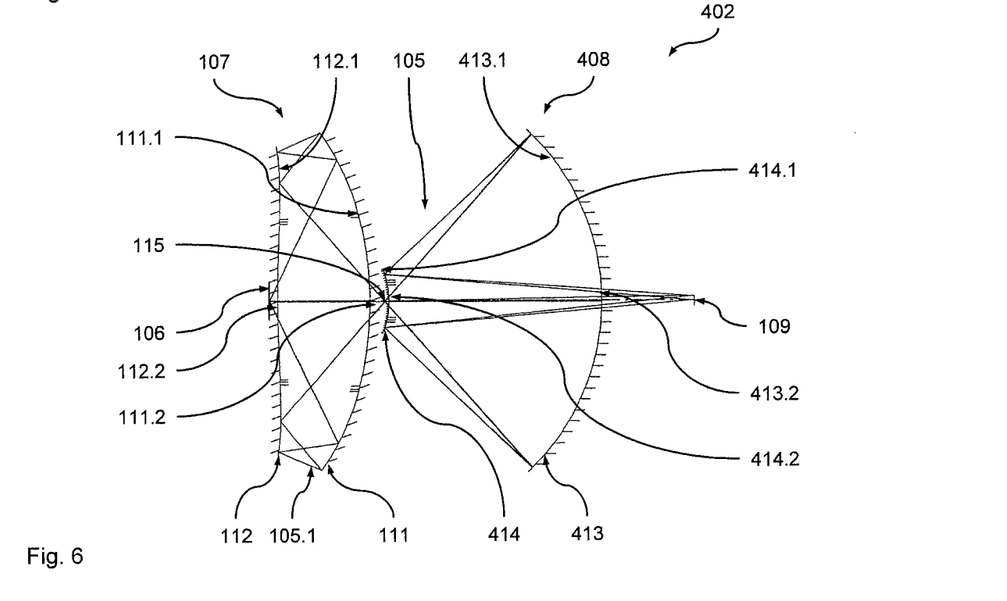
FIG. 6 is a schematic view of a further preferred embodiment of the optical imaging device according to the invention.

A further preferred embodiment of the optical imaging device according to the invention in the form of an objective 402 is described below with reference to FIGS. 1 and 6. The objective 402 can be used in the microscope 101 instead of the objective 102. The objective 402, in its fundamental structure and functionality, corresponds to the objective 102 from FIG. 2, so that merely the differences shall be discussed here. In particular, similar components carry the same reference numerals incremented by a value of 300. Unless specified otherwise below, with regard to the features of these components, reference is made expressly to the statements above.

The main difference of objective 402 from objective 102 is that the third optical element 413 is provided with a spherical third optical surface 413.1. This is advantageous in particular with regard to the production of the third optical element 413.

The present invention has been described above exclusively with reference to examples in which the second optical element group is formed in the manner of a Cassegrain system. It is however evident that in other variants of the invention it is possible for the second optical element group to be designed in the manner of a Schwarzschild system in which, as a third optical element, at a pronounced distance from the real intermediate image, a convex reflective optical element (without passage aperture) is provided and as the fourth optical element (next in the imaging beam path), a concave reflective optical element.

The present invention furthermore has been described above exclusively with reference to an example from the field of inspection of a substrate. Evidently the present invention can also be used for any other applications or imaging methods, in particular for arbitrary wavelengths of the light used for imaging.

The invention claimed is:

1. An optical imaging device, comprising:
   a first optical element group, comprising:
      a first optical element comprising a reflective first optical surface which is concave; and
      a second optical element comprising a reflective second optical surface which is concave; and
   a second optical element group, comprising:
      a third optical element comprising a reflective third optical surface,
   wherein:
      the first and second optical element groups are configured so that, during use of the optical imaging device, the first and second optical elements groups form, on an image plane, an image of an object point of an object plane via a plurality of imaging rays comprising a first imaging ray that follows an imaging ray path from the object plane to the image plane;
      the imaging path impinges at least twice on the reflective first optical surface; and
      the imaging ray path impinges at least twice on the reflective second optical surface;
      along the imaging ray path, there is not an optical surface between the first and second optical surfaces; and the optical imaging device is configured to be used in microscopy.

2. The optical imaging device of claim 1, wherein the imaging ray path impinges precisely twice on the reflective first optical surface, and/or the imaging ray path impinges precisely twice on the reflective second optical surface.

3. The optical imaging device of claim 1, wherein:
during use of the optical imaging device, the first and second optical element groups form the image of the object point in a magnifying manner via the imaging ray during use of the optical imaging device;
the reflective first optical surface is in the imaging ray path;
the reflective second optical surface is in the imaging ray path; and
the reflective third optical surface is in the imaging ray path.

4. The optical imaging device of claim 1, wherein the optical imaging device has, on the object plane side and/or the image plane side, a high aperture end with a numerical aperture of at least 0.7.

5. The optical imaging device of claim 4, wherein the optical imaging device comprises a reflective optical surface which is spatially closest to the high aperture end, and the reflective optical surface which is spatially closest to the high aperture end is a planar surface or a concave surface.

6. The optical imaging device of claim 4, wherein the optical imaging device comprises an optical element which is spatially closest to the high aperture end, and the optical element which is spatially closest to the high aperture end has an aspect ratio of at most 5%.

7. The optical imaging device of claim 4, wherein the optical imaging device comprises an optical element spatially which is closest to the high aperture end, and the optical element which is spatially closest to the high aperture end has a maximum opening of from 0.2 to 0.8 time the numerical aperture at the high aperture end.

8. The optical imaging device of claim 4, wherein a half field diameter at the high aperture end is greater than 0.2 mm.

9. The optical imaging device of claim 1, wherein the second optical element group comprises a fourth optical element comprising a reflective fourth optical surface, the reflective fourth optical surface being convex.

10. The optical imaging device of claim 1, wherein the optical imaging device comprises at least one reflective optical surface which is aspherical, and the at least one reflective optical surface which is aspherical is selected from the group consisting of the reflective first optical surface, the reflective second optical surface and the reflective third optical surface.

11. The optical imaging device of claim 1, wherein the optical imaging device comprises at least one of the reflective optical which is spherical, and the at least one reflective optical surface which is spherical is selected from the group consisting of the reflective first optical surface, the reflective second optical surface and the reflective third optical surface.

12. The optical imaging device of claim 1, wherein the optical imaging device has a pupil obscuration that is less than 30%.

13. The optical imaging device of claim 1, wherein the optical imaging device is configured to generate at least one real intermediate image during use.

14. The optical imaging device of claim 13, wherein the at least one real intermediate image is in an area of a convex reflective optical surface.

15. The optical imaging device of claim 1, wherein:
the first and second optical elements each have a central passage aperture; and all optical elements with a concave reflective optical surface have a central passage aperture.

16. The optical imaging device of claim 1, wherein the first and second optical element groups are configured to image the object point to infinity.

17. The optical imaging device of claim 1, wherein the optical element spatially closest to the object plane has a high edge thickness, and a ratio of edge thickness to center thickness of the optical element is at least 0.05.

18. The optical imaging device of claim 1, wherein the optical imaging device is configured to be used with an imaging ray having a wavelength of 193 nm to 436 nm.

19. A microscope, comprising:
a substrate device configured to hold a substrate;
an illumination device configured to illuminate the substrate with at least one imaging beam;
a projection device comprising an optical imaging device, the optical imaging device being an optical imaging device according to claim 1; and
an image receiving device,
wherein the projection device is configured to project the imaging beam onto the image receiving device.

20. The microscope of claim 19, wherein, along the imaging ray path, the first optical element group is upstream of the second optical element group.

21. The microscope of claim 20, wherein, along the imaging ray path, the first optical element is upstream of the second optical element.

22. The microscope of claim 19, wherein, along the imaging ray path, the first optical element group is upstream of the second optical element group.

23. The microscope of claim 22, wherein, along the imaging ray path, the first optical element is upstream of the second optical element.

24. The optical imaging device of claim 1, wherein, along the imaging ray path, the first optical element group is upstream of the second optical element group.

25. The optical imaging device of claim 24, wherein, along the imaging ray path, the first optical element is upstream of the second optical element.

26. An optical imaging device having an imaging ray path from an object plane to an image plane, the optical imaging device comprising:
a first optical element group, comprising:
a first optical element comprising a reflective first optical surface which is concave, the first optical element being in the imaging ray path; and
a second optical element comprising a reflective second optical surface which is concave, the reflective second optical surface being the next optical surface after the reflective first optical surface along the imaging ray path; and
a second optical element group, comprising:
a third optical element comprising a reflective third optical surface, the third optical element being in the imaging ray path,
wherein:
the first and second optical element groups are configured so that, during use of the optical imaging device, the first and second optical element groups form an image on an image plane of an object point of an object plane via an imaging ray having the imaging ray path,
the reflective first optical surface faces away from the reflective third optical surface;
the reflective first optical surface is configured so that, on formation of the image of the object point, a multiple reflection of the imaging ray takes place on the reflective first optical surface; and the optical imaging device is configured to be used in microscopy.

27. A microscope, comprising:

a substrate device configured to hold a substrate;

an illumination device configured to illuminate the substrate with at least one imaging beam;

a projection device comprising an optical imaging device, the optical imaging device being an optical imaging device according to claim 26; and an image receiving device, wherein the projection device is configured to project the imaging beam onto the image receiving device.

28. The optical imaging device of claim 26, wherein, along the imaging ray path, the first optical element group is upstream of the second optical element group.

29. The optical imaging device of claim 28, wherein, along the imaging ray path, the first optical element is upstream of the second optical element.

* * * * *